(12) United States Patent
Oyama

(10) Patent No.: US 10,106,161 B2
(45) Date of Patent: Oct. 23, 2018

(54) VEHICLE TRAVEL CONTROL DEVICE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 21 days.

(21) Appl. No.: 15/416,214

(22) Filed: Jan. 26, 2017

(65) Prior Publication Data

US 2017/0267237 A1    Sep. 21, 2017

(30) Foreign Application Priority Data

Mar. 17, 2016 (JP) ................. 2016-053478

(51) Int. Cl.
*B60W 30/00* (2006.01)
*B60W 30/12* (2006.01)
(Continued)

(52) U.S. Cl.
CPC .......... *B60W 30/165* (2013.01); *B60W 30/12* (2013.01); *B60W 2550/302* (2013.01); *B60W 2550/306* (2013.01)

(58) Field of Classification Search
CPC .... B60W 30/00; B60W 30/12; B60W 30/165; B60W 2550/408; G05D 1/00;
(Continued)

(56) References Cited

U.S. PATENT DOCUMENTS 8,352,112 B2 * 1/2013 Mudalige ................. G08G 1/22
340/435
8,676,466 B2 * 3/2014 Mudalige ................. G08G 1/22
370/252
(Continued)

FOREIGN PATENT DOCUMENTS

JP    2000-020896 A    1/2000
JP    2015-210720 A    11/2015

OTHER PUBLICATIONS

Office Action issued in corresponding Japanese Patent Application No. 2016-053478, dated Aug. 1, 2017 with English Translation.

*Primary Examiner* — Yonel Beaulieu
(74) *Attorney, Agent, or Firm* — McDermott Will and Emery LLP

(57) ABSTRACT

A vehicle travel control device includes a preceding vehicle offset calculation unit and a control target point setting unit. The preceding vehicle offset calculation unit calculates a lateral offset amount of a center position of a preceding vehicle with respect to a center position of a travel lane, in a first state where a host vehicle recognizes the travel lane. The control target point setting unit sets the center position of the travel lane as a control target point of travel control to follow the travel lane, when the host vehicle is in the first state, and that sets a position shifted as much as the offset amount from the center position of the preceding vehicle as a control target point of travel control to follow the preceding vehicle, when the host vehicle shifts from the first state to a second state where the host vehicle does not recognize the travel lane.

6 Claims, 5 Drawing Sheets

(51) Int. Cl.
*G05D 1/00* (2006.01)
*B60W 30/165* (2012.01)

(58) Field of Classification Search
CPC ......... G05D 1/0295; G05D 2201/0213; G08G 1/16; G08G 1/163; G08G 1/164; G01S 19/40; G01S 2013/9325
See application file for complete search history.

(56) References Cited

U.S. PATENT DOCUMENTS

| | | | |
|---|---|---|---|
| 8,775,060 B2 * | 7/2014 | Solyom | G08G 1/22 180/168 |
| 9,550,494 B2 | 1/2017 | Aso | |
| 2010/0256852 A1 * | 10/2010 | Mudalige | G08G 1/163 701/24 |
| 2011/0190972 A1 * | 8/2011 | Timmons | G01C 21/34 701/31.4 |
| 2011/0196514 A1 * | 8/2011 | Cao | G05B 13/048 700/50 |
| 2014/0019031 A1 * | 1/2014 | Solyom | G08G 1/22 701/117 |
| 2015/0307095 A1 | 10/2015 | Aso | |
| 2016/0200321 A1 * | 7/2016 | Yamada | B60W 10/06 701/96 |

* cited by examiner

VEHICLE TRAVEL CONTROL DEVICE

CROSS-REFERENCE TO RELATED APPLICATIONS

The present application claims priority from Japanese Patent Application No. 2016-053478 filed on Mar. 17, 2016, the entire contents of which are hereby incorporated by reference.

BACKGROUND

1. Technical Field

The present invention relates to a vehicle travel control device for performing travel control by recognizing a travel lane of a host vehicle and a preceding vehicle traveling ahead of the host vehicle.

2. Related Art

In the related art, in a vehicle such as an automobile, following travel control is known in which a camera or a radar detects a travel lane of a host vehicle or a preceding vehicle traveling ahead of the host vehicle so as to control an inter-vehicle distance from the preceding vehicle to be a suitable distance, and in which a lateral position of the host vehicle inside the travel lane is controlled so that the host vehicle follows a lane center position or a center position of the preceding vehicle.

For example, Japanese Unexamined Patent Application Publication (JP-A) No. 2000-20896 discloses a technique in which travel control is performed so as to follow a lane center line when a lane line on a road can be detected, and in which travel control is performed so as to follow a center position of the preceding vehicle when the lane line is hidden by the preceding vehicle and cannot be detected. According to this technique in the related art, when the host vehicle travels to follow the preceding vehicle, a control gain is weakened in a case where a possibility that the preceding vehicle may turn to the right or left is determined, based on map information, and following control is weakened by estimating zigzag travel of the preceding vehicle, based on a change in lateral displacement of the preceding vehicle, thereby attempting to reduce an improper behavior change of the host vehicle.

However, the technique disclosed in JP-A No. 2000-20896 gives no consideration to controllability required when the host vehicle switches between the travel to follow the lane and the travel to follow the preceding vehicle. Under a condition that the preceding vehicle travels biased from a lane center line, there is a possibility that a behavior change of the host vehicle may greatly increase when the travel control to follow the lane is switched to the travel control to follow the preceding vehicle.

For example, as illustrated in FIG. 5, in a three-lane road, a center lane has broken line-shaped lane lines L1 and L2 on both sides. Accordingly, when a host vehicle C travels along the center lane, the host vehicle C periodically meets a scene in which the lane lines L1 and L2 on both sides are out of a camera's view R at the same time and are not recognizable. In a state where the lane lines L1 and L2 on both sides are recognized, the host vehicle C travels to follow a center position of the lane lines L1 and L2. However, when the lane lines L1 and L2 on both sides are not recognizable, the travel control is switched to the travel control to follow a preceding vehicle C1. In this case, if a center position of the preceding vehicle C1 is offset from the lane center position, a target point in the following travel is changed from the lane center position to the center position of the preceding vehicle C1, thereby causing the host vehicle C to travel unsteadily. Furthermore, there is a possibility that the host vehicle C may travel zigzag due to periodically switched following target points.

SUMMARY OF THE INVENTION

It is desirable to provide a vehicle travel control device which can ensure safety by restraining a behavior change in a host vehicle when the host vehicle switches between travel control to follow a travel lane and travel control to follow a preceding vehicle.

An aspect of the present invention provides a vehicle travel control device that switches travel control between travel control for traveling to follow a travel lane of a host vehicle and travel control for traveling to follow a preceding vehicle by recognizing the travel lane and the preceding vehicle. The vehicle travel control device includes a preceding vehicle offset calculation unit that calculates a lateral offset amount of a center position of the preceding vehicle with respect to a center position of the travel lane, in a first state where the host vehicle recognizes the travel lane, and a control target point setting unit that sets the center position of the travel lane as a control target point of the travel control to follow the travel lane, when the host vehicle is in the first state, and that sets a position shifted as much as the offset amount from the center position of the preceding vehicle as a control target point of the travel control to follow the preceding vehicle, when the host vehicle shifts from the first state to a second state where the host vehicle does not recognize the travel lane.

In a case the second state continues for a predetermined time or longer, the control target point setting unit may clear the offset amount, and sets the control target point to the center position of the preceding vehicle.

When the host vehicle returns to the first after the control target point setting unit sets the control target point to the center position of the preceding vehicle in the second state, the control target point setting unit may gradually move the control target point to the center position of the travel lane.

In a case where the travel lane is intermittent at every fixed distance, the control target point setting unit may determine whether the fixed distance exceeds a distance of a lane-broken section of the travel lane, on a basis of a vehicle speed of the host vehicle, thereby determining whether the second state continues for a predetermined time or longer.

An aspect of the present invention provides a vehicle travel control device that switches travel control between travel control for traveling to follow a travel lane of a host vehicle and travel control for traveling to follow a preceding vehicle by recognizing the travel lane and the preceding vehicle. The vehicle travel control device includes circuitry. The circuitry is configured to calculate a lateral offset amount of a center position of the preceding vehicle with respect to a center position of the travel lane, in a first state where the host vehicle recognizes the travel lane. The circuitry is configured to set the center position of the travel lane as a control target point of the travel control to follow the travel lane, when the host vehicle is in the first state, and set a position shifted as much as the offset amount from the center position of the preceding vehicle as a control target point of the travel control to follow the preceding vehicle, when the host vehicle shifts from the first state to a second state where the host vehicle does not recognize the travel lane.

DETAILED DESCRIPTION

Figure 1:
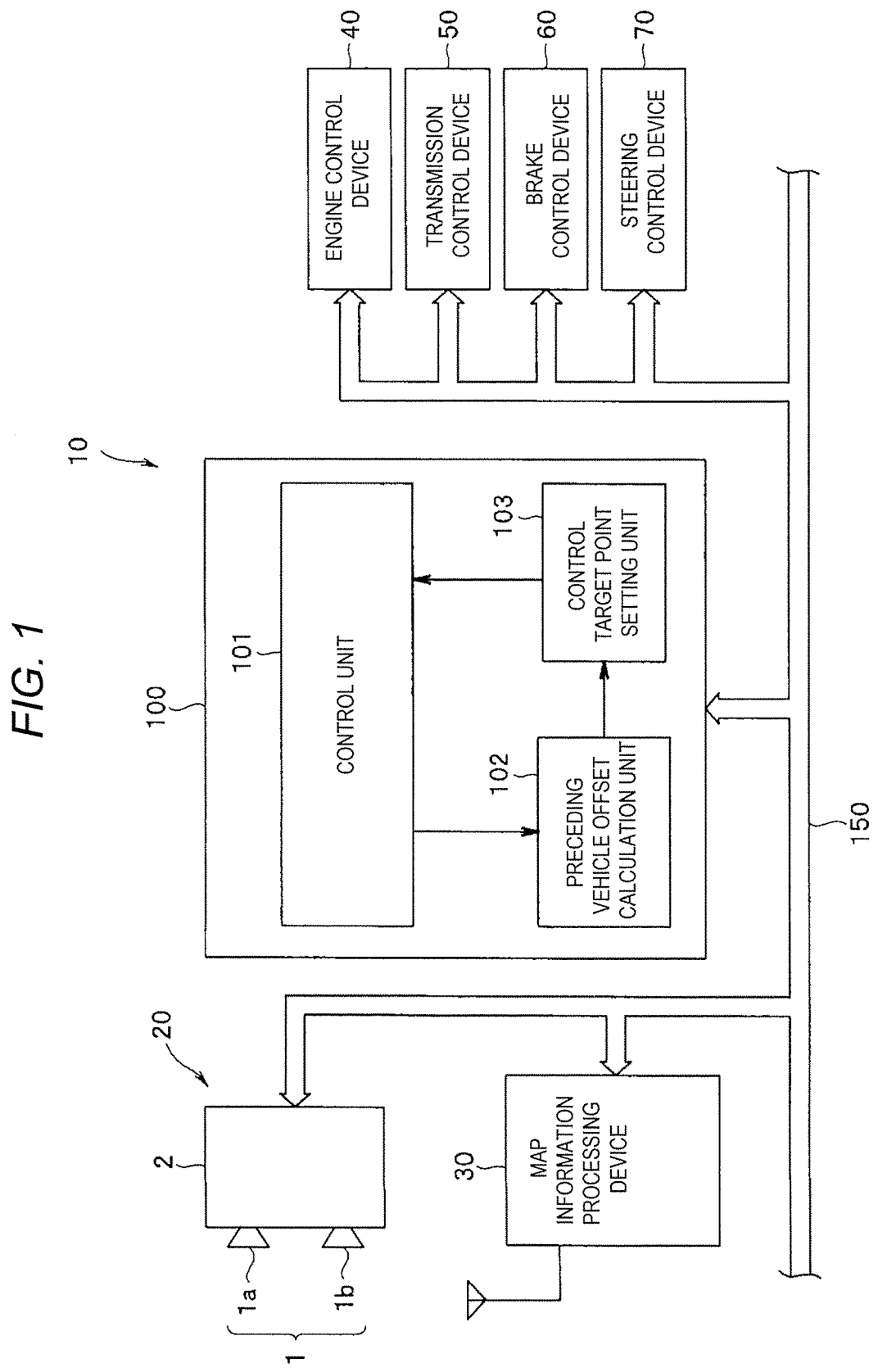
FIG. 1 is a configuration diagram of a travel control system.

Hereinafter, an example according to an aspect of the present invention will be described with reference to the drawings. In FIG. 1, the reference numeral 10 represents a travel control system of a vehicle such as an automobile, which performs travel control including autonomous self-driving of the vehicle. The travel control system 10 adopts a configuration in which an external environment recognition device 20, a map information processing device 30, an engine control device 40, a transmission control device 50, a brake control device 60, and a steering control device 70 are coupled to each other via a communication bus 150 forming an in-vehicle network, around the travel control device 100.

The external environment recognition device 20 employs various devices such as an onboard camera, a millimeter-wave radar, and a laser radar so as to recognize an external environment around a host vehicle. In this example, a case will be mainly described in which as the external environment recognition device 20, an onboard camera 1 and an image recognition device 2 are employed so as to recognize the external environment.

In this example, the camera 1 is a stereo camera including two cameras 1a and 1b which image the same object from mutually different viewpoints, and is a shutter-synchronized camera having an imaging device such as CCD and CMOS. For example, the cameras 1a and 1b are disposed so as to have a predetermined base line length in the vicinity of an inner rear-view mirror which is located inside a front window and in an upper portion in a vehicle compartment.

A pair of right and left images captured by the camera 1 are processed by the image recognition device 2. The image recognition device 2 obtains a pixel deviation amount (parallax) at corresponding positions of the right and left images by performing a stereo matching processing, and generates a distance image by converting the pixel shift amount to brightness data. Based on principles of triangulation, a point on the distance image is coordinate-transformed to a point on a real space in which a vehicle width direction of a host vehicle, that is, a lateral direction is set to an X-axis, a vehicle height direction is set to a Y-axis, and a vehicle longitudinal direction, that is, a distance direction is set to a Z-axis. In this manner, the image recognition device 2 three-dimensionally recognizes a lane line (lane), an obstacle, and a preceding vehicle traveling ahead of the host vehicle, on a road on which the host vehicle travels.

The lane line as the lane can be recognized by extracting a point group having lane line candidates from an image and by calculating a straight line or a curve connecting candidate points thereof to each other. For example, within a lane line detection region set on the image, the image recognition device 2 detects an edge whose brightness varies to a predetermined level or higher on multiple search lines set in a horizontal direction (vehicle width direction), and detects a set of a lane line start point and a lane line end point for each search line, thereby extracting an intermediate region between the lane line start point and the lane line end point, as a lane line candidate point.

Then, the image recognition device 2 processes time series data relating to a spatial coordinate position of the lane line candidate point based on a vehicle movement amount per unit time, and calculates a model which approximates to right and left lane lines, thereby recognizing the lane lines through the model. As the model which approximates to the lane lines, it is possible to use an approximate model in which straight line components obtained by performing the Hough transform are linked to each other, or an approximate model obtained using a quadratic equation curve.

The map information processing device 30 includes a map database. Based on a signal transmitted from a GPS satellite, the map information processing device 30 measures a position of the host vehicle, and compares the measured position with map data. The map database includes map data for guiding a travel route of a vehicle or for displaying a current position of the vehicle, and high-resolution map data for performing driving support control including self-driving.

Via a display device (not illustrated), the map information processing device 30 presents a driver with travel route guide or traffic information based on comparison between a result of measuring the position of the host vehicle and the map data. The map information processing device 30 outputs travel controlling map information such as a curvature of the road on which the host vehicle and the preceding vehicle travel, road shape data including a lane width and a road shoulder width, a road azimuth angle, types of road lane line, and the number of lanes.

The engine control device 40 controls an operating state of an engine (not illustrated), based on a signal transmitted from various sensors for detecting the operation state of the engine and various pieces of control information transmitted via the communication bus 150. For example, based on an intake air amount, a throttle position, an engine coolant temperature, an intake air temperature, an air-fuel ratio, a crank angle, an accelerator position, and other vehicle information, the engine control device 40 performs engine control which mainly includes fuel injection control, ignition timing control, and opening control for an electronic control throttle valve.

Based on a signal transmitted from various sensors for detecting a transmission shift position or a vehicle speed, and various pieces of control information transmitted via the communication bus 150, the transmission control device 50 controls hydraulic pressure supplied to an automatic transmission (not illustrated), and controls the automatic transmission in accordance with preset transmission characteristics.

For example, based on other vehicle information relating to a brake switch, a wheel speed of a four-wheel vehicle, a steering wheel angle, and a yaw rate, the brake control device 60 controls a brake device (not illustrated) of the four-wheel vehicle, independently of a driver's brake operation. In addition, based on a braking force of each wheel, the brake control device 60 calculates brake hydraulic pressure of each wheel, and performs antilock brake system control or sideslip prevention control.

For example, based on other vehicle information relating to a vehicle speed, a driver's steering torque, a steering wheel angle, and a yaw rate, the steering control device 70 controls assist torque generated by an electric power steering motor (not illustrated) installed in a vehicle steering system. In addition, in accordance with an instruction output from the travel control device 100, the steering control device 70 controls the electric power steering motor so as to be driven using a steering amount required for following a travel lane or the preceding vehicle.

Next, the travel control device 100 functioning as the center of the travel control system 10 will be described. Based on a result of the external environment recognized by the external environment recognition device 20, the travel control device 100 performs travel control on the host vehicle to travel to follow the travel lane of the host vehicle, and travel control on the host vehicle to travel to follow the preceding vehicle, via the engine control device 40, the transmission control device 50, the brake control device 60, and the steering control device 70. The travel control is performed by a control unit 101 which is a primary unit of the travel control device 100.

In detail, the control unit 101 detects a lane line on the road as the travel lane of the host vehicle, and sets a target course along the travel lane. The travel control to follow the target course means travel control to follow the lane (lane following travel control). In a case where the host vehicle does not detect the preceding vehicle traveling ahead of the host vehicle, the control unit 101 controls the host vehicle so as to travel on the target course at a set speed. In a case where the host vehicle detects the preceding vehicle traveling ahead of the host vehicle, the control unit 101 controls the host vehicle so as to travel on the target course at a set vehicle speed while the host vehicle maintains a predetermined inter-vehicle distance from the preceding vehicle.

The target course to follow the lane is set as a track P of the center position in the lateral direction (width direction) of the right and left lane lines (travel lane of the host vehicle). For example, in a case where the right and left lane lines are approximated using a quadratic curve, the target course can be expressed by Equation (1) below. In Equation (1), a coefficient K1 represents a curvature component, a coefficient K2 represents a yaw angle component of the target course (slope component of the target course with respect to the host vehicle), and a coefficient K3 represents a lateral position component of the target course with respect to the host vehicle.

$$P = K1*Z^2 + K2*Z + K3 \quad (1)$$

In the travel control to follow the target course, the control unit 101 controls a steering angle of the host vehicle via the steering control device 70 so that the center position in the vehicle width direction of the host vehicle coincides with the control target point on the target course. In the steering control to follow the control target point, the control unit 101 mainly performs feedback control based on deviation between the lateral position inside the lane of the host vehicle and the control target point.

For example, as expressed by Equation (2) below, a target steering angle $\alpha ref$ is calculated in such a way that a steering angle $\alpha y$ corresponding to the deviation feedback for causing a yaw angle of the host vehicle to coincide with the yaw angle component of the target course and a steering angle $\alpha ff$ corresponding to the feedforward based on a curvature of the target course are added to a steering angle $\alpha f$ corresponding to the feedback based on the deviation between the lateral position of the host vehicle and the control target point. Then, the electric power steering motor is controlled to be driven by a target steering torque which realizes the target steering angle $\alpha ref$.

$$\alpha ref = \alpha f + \alpha y + \alpha ff \quad (2)$$

On the other hand, in a case where the host vehicle slowly travels close to the preceding vehicle in a traffic jam and the lane line does not come into a view of the camera 1, or in a case where there is no lane line on the travel lane or the lane line is interrupted and is not recognizable, the control unit 101 performs the travel control on the host vehicle to follow the preceding vehicle. In the travel control to follow the preceding vehicle, the control unit 101 performs the steering control via the steering control device 70 so as to coincide with the travel locus of the preceding vehicle, and performs travel driving control via the engine control device 40, the transmission control device 50, and the brake control device 60.

The travel locus of the preceding vehicle can be obtained similarly to the target course based on the lane. For example, based on a movement amount of the host vehicle per one frame of a captured image of the camera 1, a candidate point is obtained for each frame at a position of the preceding vehicle so as to calculate a curve approximate to a point group of the candidate points as the travel locus of the preceding vehicle. As the position of the preceding vehicle, the center position in the lateral direction (in the vehicle width direction) in the rear area of the preceding vehicle is obtained from the captured image of the camera 1, and the center position is set as the candidate point indicating the position of the preceding vehicle.

Then, for example, the least-squares method is applied to the point group of the candidate points so as to obtain a curve similar to that expressed in Equation (1) above. This curve is set to the travel locus of the preceding vehicle. In this case, the coefficient K1 in Equation (1) represents the curvature component of the travel track, the coefficient K2 represents the yaw angle component of the travel track (slope component of the travel locus with respect to the host vehicle), and the coefficient K3 represents the lateral position component of the travel track with respect to the host vehicle.

In the control to follow the travel locus of the preceding vehicle, a setting position in the vehicle width direction in the rear area of the preceding vehicle is set to the control target point, and the steering angle is corrected so that the lateral position inside the lane of the host vehicle coincides with the control target point. In this manner, the control unit 101 performs control for determining a travel direction of the host vehicle. As will be described later, the position set as the control target point is set to the center position in the vehicle width direction in the rear area of the preceding vehicle, as a reference position. The reference position is appropriately shifted when the following travel control is switched.

The steering control in traveling to follow the preceding vehicle is basically the same as the steering control in traveling to follow the lane, and is performed by performing mainly feedback control based on the deviation between the lateral position inside the lane of the host vehicle and the control target point. However, in the travel control to follow the preceding vehicle, the host vehicle frequently travels at a relatively slow speed. Accordingly, it is possible to omit the steering angle $\alpha ff$ corresponding to the feedforward based on the curvature in Equation (2) expressed above.

As described above, in a case where the lane line is not recognizable during the travel control based on lane line recognition, the travel control to follow the lane is switched to the travel control to follow the preceding vehicle. However, in a case where the center position of the preceding vehicle is offset from the lane center position, the steering control target point is rapidly moved from the lane center position to the center position of the preceding vehicle, thereby causing a possibility that the behavior of the host vehicle may become unstable.

For example, in a case where the host vehicle travels along the center lane on the road having a three-lane section, the lane lines on both sides of the lane have a broken line shape. Accordingly, the host vehicle periodically meets a scene in which the lane lines on both sides are invisible at the same time. Therefore, in a case where the center position of the preceding vehicle is offset from the lane center position, the control target point varies each time the lane lines are invisible, thereby causing the host vehicle to travel unsteadily.

In contrast, when the travel control device 100 recognizes the lane and the preceding vehicle from the image ahead of the host vehicle which is captured by the camera 1, the travel control device 100 calculates an offset amount from the lane center position of the preceding vehicle, and stores a value thereof. Then, in a case where the host vehicle is expected to meet a section whose lane is not temporarily recognizable from recognized information of the image captured in a time-series manner or the map information output from the map information processing device 30, in the section whose lane is not recognizable, the travel control device 100 sets a position shifted as much as the pre-stored offset amount from the center position of the preceding vehicle, as the control target point, and switches the travel control to the following travel to follow the preceding vehicle. In this manner, it is possible to prevent the host vehicle from traveling unsteadily by restraining variations in the control target point. In a case where the section whose lane line is not visible is longer than expected, the travel control device 100 determines that the lane line no longer exist, and cancels the shift of the control target point.

Therefore, as illustrated in FIG. 1, with respect to the control unit 101 serving as a primary functional unit, the travel control device 100 includes a preceding vehicle offset calculation unit 102 and a control target point setting unit 103. The control unit 101 performs the travel control to follow the lane line and the travel control to follow the preceding vehicle, as the travel control to follow the control target point set by the control target point setting unit 103.

The preceding vehicle offset calculation unit 102 obtains the lateral position of the preceding vehicle inside the lane from the lane (lane line) recognized from the image captured by the camera 1, and calculates the offset amount from the lane center position together with an offset direction. The calculated offset amount is stored in a memory, and is updated to the latest offset amount which is frequently calculated in accordance with the movement of the preceding vehicle.

Figure 2:
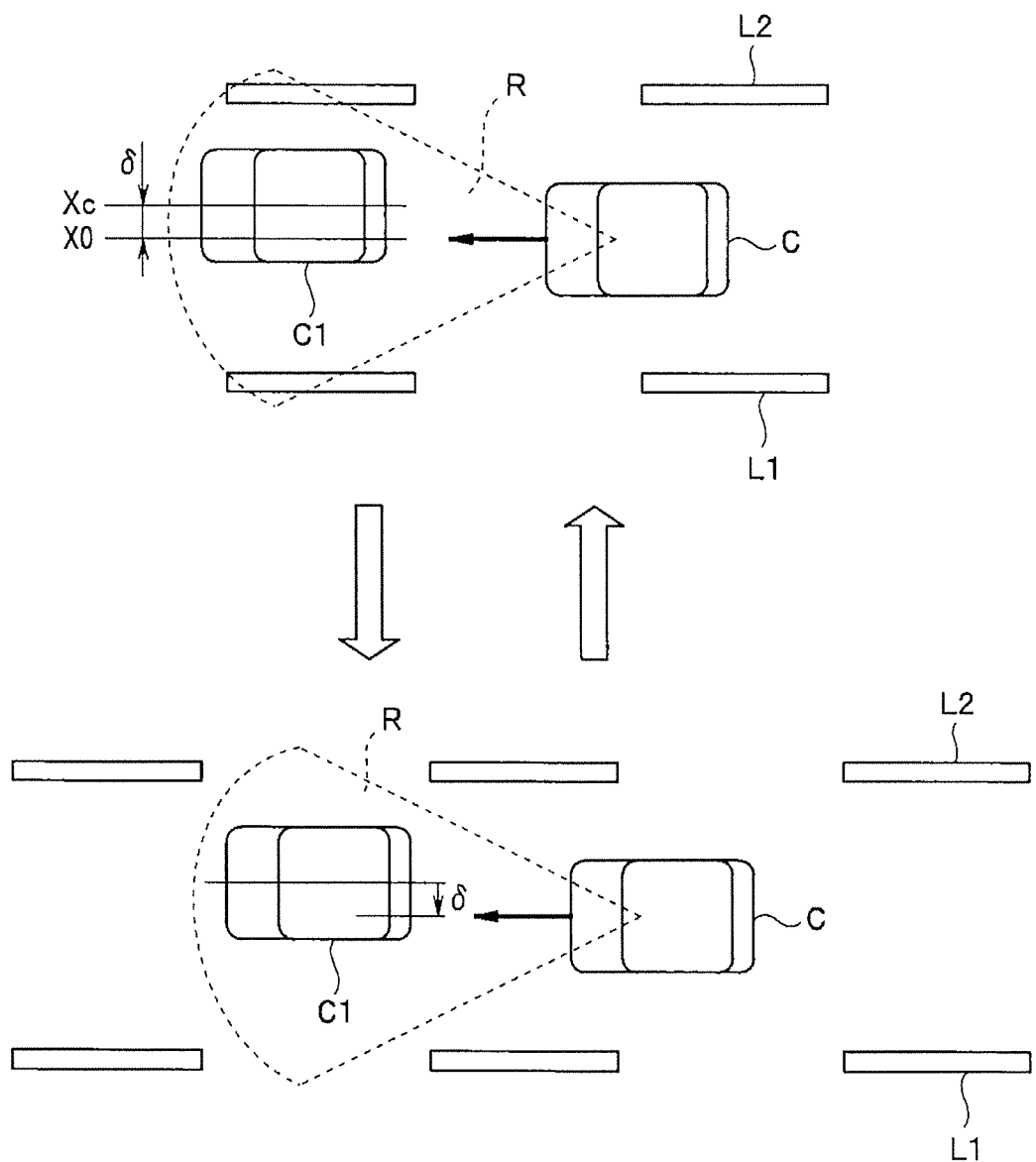
FIG. 2 is a view for describing a change in a control target point which is set in view of offset of a preceding vehicle.

For example, as illustrated in FIG. 2, in a case where the host vehicle C travels inside the lane formed from the broken line-shaped lane lines L1 and L2, the host vehicle C periodically meets a scene in which the lane lines L1 and L2 on both sides are out of a camera's view R at the same time and are not recognizable. Therefore, when the lane lines L1 and L2 are recognizable through the camera's view R, the preceding vehicle offset calculation unit 102 calculates an offset amount δ from a lane center position Xo at a center position Xc of the preceding vehicle C1, and stores a value thereof.

The control target point setting unit 103 frequently refers to the offset amount (stored value). In accordance with a state of the lane line (lane) recognized by the external environment recognition device 20 (the camera 1 and the image recognition device 2), the control target point setting unit 103 sets the control target point of the steering control for following travel to follow the lane or the preceding vehicle, based on the offset amount of the preceding vehicle which is calculated by the preceding vehicle offset calculation unit 102.

That is, in a state where the lane is recognized, the control target point setting unit 103 set the lane center position as the control target point, and performs the travel control to follow the lane by transmitting the control target point to the control unit 101. When a state where the lane is recognized is switched to a state where the lane is not recognized, the control target point setting unit 103 uses the offset amount calculated by the preceding vehicle offset calculation unit 102, and sets the position shifted as much as the offset amount from the center position of the preceding vehicle, as the control target point.

In an example illustrated in FIG. 2, when the lane lines L1 and L2 on both sides are temporarily out of the camera's view R and are not recognizable, the control target point setting unit 103 moves the control target point located at the lane center position Xo so far to the position shifted as much as the offset amount δ from the center position Xc of the preceding vehicle C1, thereby restraining variations in the control target point.

In a case where the state where the lane is not recognized is continued for a predetermined time or longer, the control target point setting unit 103 clears the offset amount of the preceding vehicle, and switches the travel control to the normal travel control to follow the preceding vehicle, in which the control target point is set to the center position of the preceding vehicle. Then, during the travel control to follow the center position of the preceding vehicle as the control target point, when the state where the lane is recognized is restored, the control target point setting unit 103 gradually moves the control target point from the center position of the preceding vehicle to the lane center position, and gradually switches traveling to follow the preceding vehicle to traveling to follow the lane.

Figure 3:
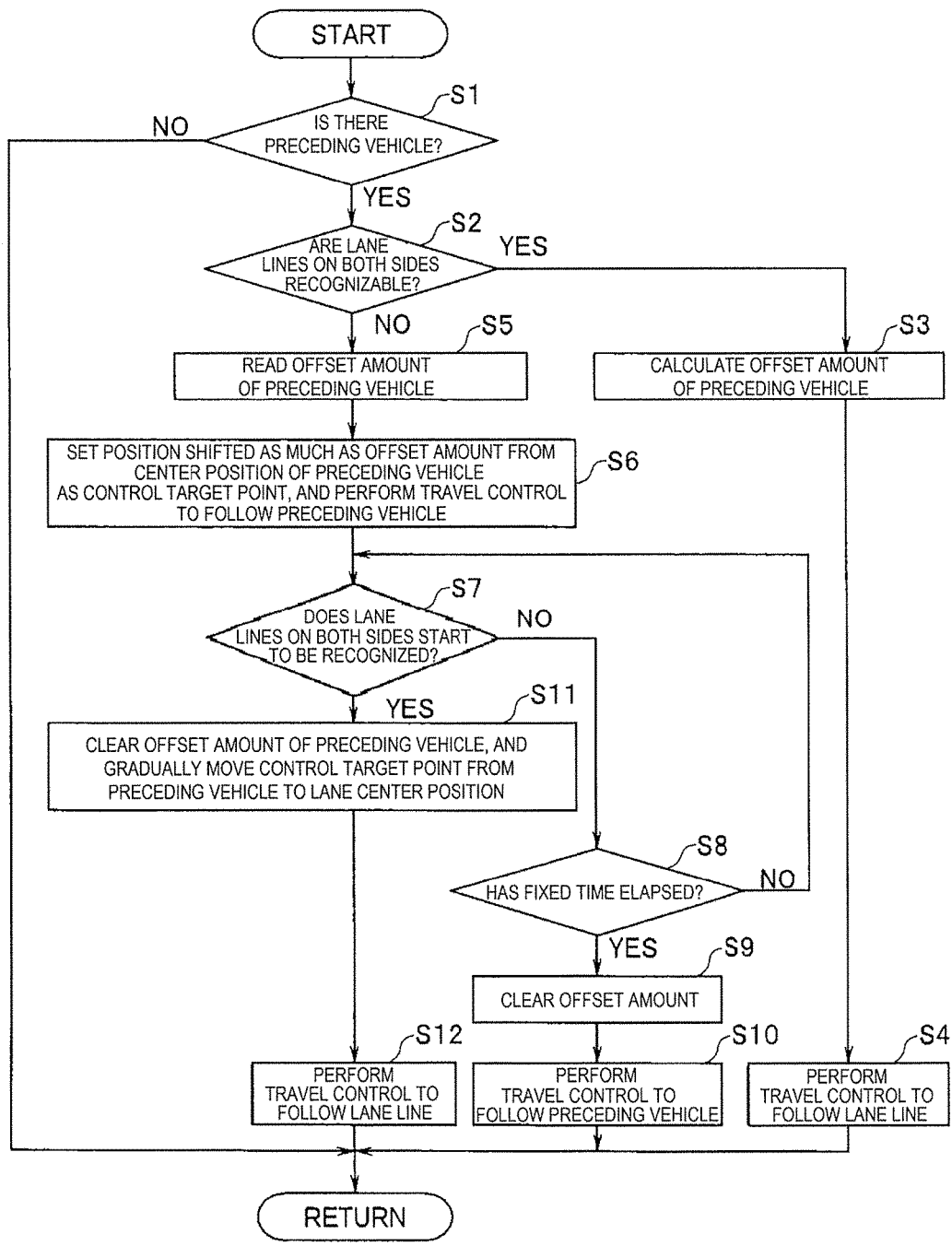
FIG. 3 is a flowchart of travel control.

Next, a program process of the travel control in the travel control device 100 will be described with reference to a flowchart illustrated in FIG. 3.

In the travel control, in initial Step S1, it is checked whether or not there is the preceding vehicle recognized within a predetermined range set ahead of the host vehicle. Then, in a case where the preceding vehicle is not recognized, the process in Step S1 is skipped. In a case where the preceding vehicle is recognized, the proceeds to Step S2 so as to check whether or not the lane lines on both right and left sides are out of the camera's view and are not recognizable.

In a case where the lane lines on both sides are recognized in Step S2, the process proceeds from Step S2 to Step S3. In view of a distance from the host vehicle to the preceding vehicle, deviation (offset amount) is calculated between the center position in the lateral direction of the right and left lane lines and the lateral position of the preceding vehicle, and the deviation is stored in the memory. Then, in Step S4, the travel control to follow the lane line is performed. In the travel control to follow the lane line, the center position of the right and left lanes is set as the control target point. While a predetermined inter-vehicle distance from the preceding vehicle is maintained, a vehicle speed and a steering angle are controlled so that the lateral position inside the lane of the host vehicle falls within the control target point.

On the other hand, in a case where the lane lines on both sides are not recognized in Step S2, the process proceeds from Step S2 to Step S5 so as to read the offset amount from the lane center position of the preceding vehicle which is stored in the memory. Then, in Step S6, the position shifted as much as the offset amount from the center position of the preceding vehicle is set as the control target point. In this manner, the travel control to follow the preceding vehicle is performed.

In this case, in the travel control to follow the preceding vehicle, the position shifted as much as the offset amount from the center position of the preceding vehicle is set as the control target point. Accordingly, it is possible to restrain rapid variations in the control target point. When the host vehicle travels on a straight road or travels very slowly in a traffic jam, the travel control to follow the preceding vehicle is substantially the same as the travel control to follow the lane center position. Accordingly, a driver does not feel different even though the travel control is switched therebetween. However, a case is excluded where the offset amount is cleared in Steps S9 and S10 (to be described later) and the travel control is previously switched to the travel control to follow the preceding vehicle.

Thereafter, the process proceeds to Step S7. The state where the lane lines on both sides are not recognized is switched to the state where the lane lines are recognizable so as to check whether or not the lane lines on both sides start to be recognized. As a result, in a case where the lane lines are not yet recognized, the process proceeds from Step S7 to Step S8. Based on the vehicle speed and the inter-vehicle distance, it is determined whether or not a fixed time has elapsed from when the lane lines on both sides are not recognizable.

For example, in a case where the lane lines on both sides have a broken line shape and marking portions on the road are intermittent at every fixed distance, a distance of the lane-broken section between the marking portions is acquired from the time series image recognition information of the road or the map information. Then, based on the vehicle speed of the host vehicle, it is determined whether or not the fixed distance exceeds a distance of the lane-broken section. In this manner, it is determined whether or not the state where the lane lines are not recognized is continued for a fixed time or longer.

In Step S8, in a case where the fixed time has not elapsed from when the lane lines on both sides are not recognized, the process returns to Step S7. In a case where the fixed time has elapsed from when the lane lines on both sides are not recognized, the process proceeds to Step S9 so as to clear the offset amount of the preceding vehicle to zero. Then, in Step S10, the center position of the preceding vehicle is set to the control target point so as to perform the travel control to follow the preceding vehicle.

On the other hand, in Step S7, in a case where the lane lines on both sides start to be recognized in the state where the lane lines on both sides are not recognized, the process proceeds from Step S7 to Step S11. The offset amount of the preceding vehicle is cleared to zero, and the control target point is gradually moved to the lane center position from the center position of the preceding vehicle. Then, in Step S12, the travel control to follow the lane is performed.

When the travel control to follow the lane is performed, in a case where the travel control is performed in advance so as to follow the position shifted as much as the offset amount from the center position of the preceding vehicle as the control target point, the movement amount of the control target point is small, and is substantially zero in some cases. In contrast, in a case where the travel control is performed so as to follow the center position of the preceding vehicle as the control target point, depending on the lateral position of the preceding vehicle, it is expected that the movement amount of the control target point is relatively large.

Figure 4:
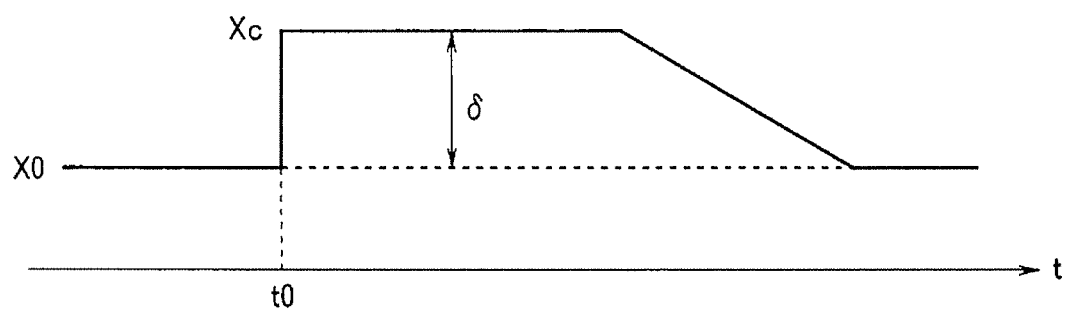
FIG. 4 is a view for describing a change in the control target point.
Figure 5:
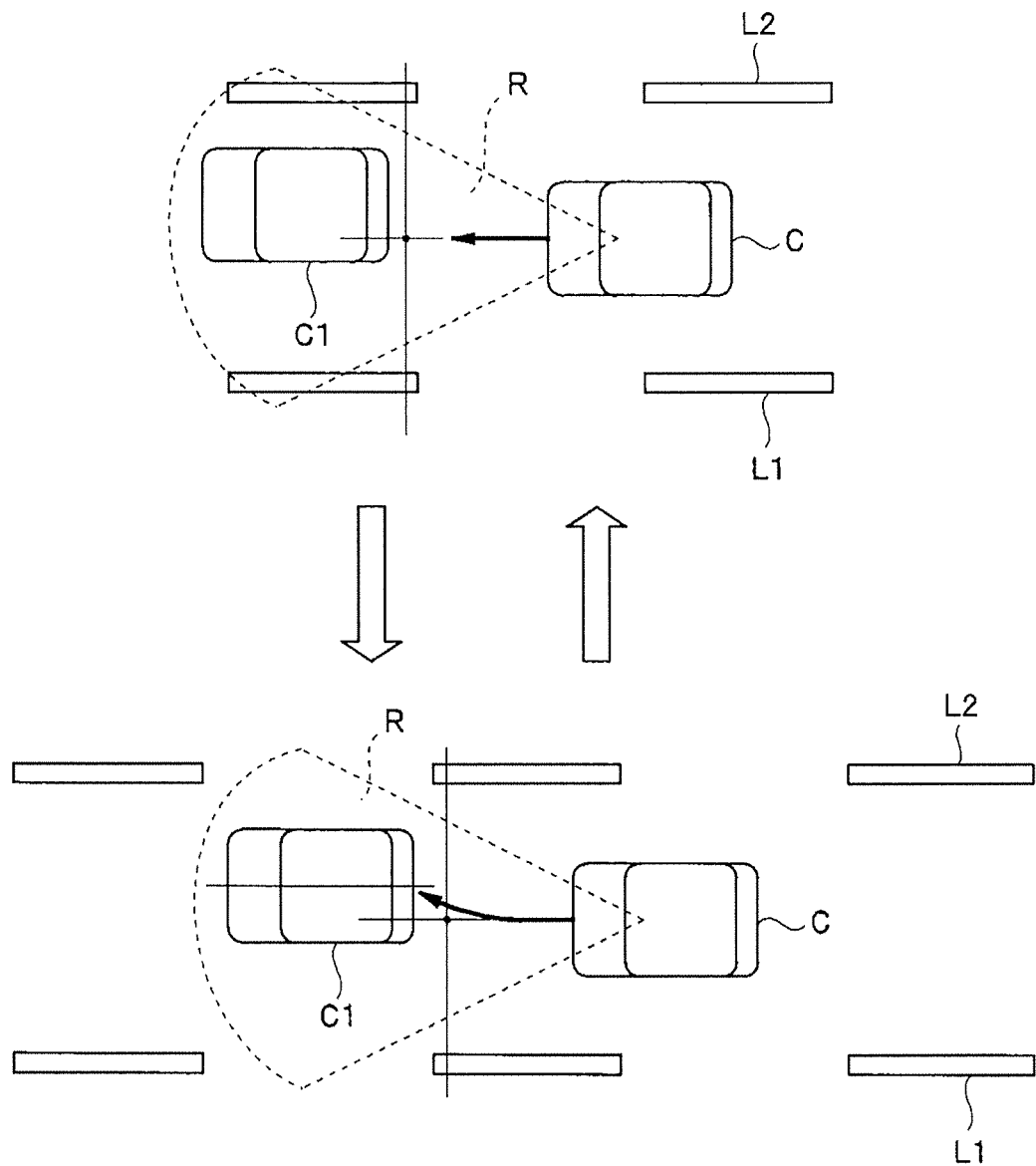
FIG. 5 is a view for describing a behavior change of a host vehicle when following travel is switched in the related art.

Therefore, as illustrated in FIG. 4, at time t0, the travel control is switched to the travel control to follow the center position of the preceding vehicle as the control target point. Thereafter, when the control target point is switched from the center position Xc of the preceding vehicle to the lane center position Xo, the control target point is moved so that the offset amount δ gradually decreases from the position Xc toward the position Xo with the lapse of time t. In this manner, rapid variations in the control target point are restrained.

In this example described above, in the state where the lane is recognized, the offset amount in the lateral direction of the center position of the preceding vehicle with respect to the lane center position is calculated in advance. When the state where the lane is recognized is switched to the state where the lane is not recognized, the position shifted as much as the offset amount from the center position of the preceding vehicle is set to the control target point. Then, the travel control to follow the lane center position is switched to the travel control to follow the preceding vehicle. In this manner, it is possible to ensure safety by restraining a behavior change in the host vehicle when the host vehicle switches between the travel control to follow the lane and the travel control to follow the preceding vehicle. Therefore, a driver does not feel anxiety.

The invention claimed is:

1. A vehicle travel control device that switches travel control between travel control for traveling to follow a travel lane of a host vehicle and travel control for traveling to follow a preceding vehicle by recognizing the travel lane and the preceding vehicle, the vehicle travel control device comprising a controller programmed to:
   calculate a lateral offset amount of a center position of the preceding vehicle with respect to a center position of the travel lane, in a first state where the host vehicle recognizes the travel lane; and
   set the center position of the travel lane as a control target point of the travel control to follow the travel lane, when the host vehicle is in the first state, and set a position shifted as much as the offset amount from the center position of the preceding vehicle as a control target point of the travel control to follow the preceding vehicle, when the host vehicle shifts from the first state to a second state where the host vehicle does not recognize the travel lane.

2. The vehicle travel control device according to claim 1, wherein in a case the second state continues for a predetermined time or longer, the controller is further programmed to clear the offset amount, and set the control target point to the center position of the preceding vehicle.

3. The vehicle travel control device according to claim 2, wherein when the host vehicle returns to the first after the control target point is set to the center position of the preceding vehicle in the second state, the controller is further programmed gradually to move the control target point to the center position of the travel lane.

4. The vehicle travel control device according to claim 2, wherein in a case where the travel lane is intermittent at every fixed distance, the controller is further programmed to determine whether the fixed distance exceeds a distance of a lane-broken section of the travel lane, on a basis of a vehicle speed of the host vehicle, thereby determining whether the second state continues for a predetermined time or longer.

5. The vehicle travel control device according to claim 3, wherein in a case where the travel lane is intermittent at every fixed distance, the controller is further programmed to determine whether the fixed distance exceeds a distance of a lane-broken section of the travel lane, on a basis of a vehicle speed of the host vehicle, thereby determining whether the second state continues for a predetermined time or longer.

6. A vehicle travel control device that switches travel control between travel control for traveling to follow a travel lane of a host vehicle and travel control for traveling to follow a preceding vehicle by recognizing the travel lane and the preceding vehicle, the vehicle travel control device comprising:

circuitry configured to calculate a lateral offset amount of a center position of the preceding vehicle with respect to a center position of the travel lane, in a first state where the host vehicle recognizes the travel lane; and set the center position of the travel lane as a control target point of the travel control to follow the travel lane, when the host vehicle is in the first state, and set a position shifted as much as the offset amount from the center position of the preceding vehicle as a control target point of the travel control to follow the preceding vehicle, when the host vehicle shifts from the first state to a second state where the host vehicle does not recognize the travel lane.

* * * * *